United States Patent Office 3,081,195
Patented Mar. 12, 1963

3,081,195
GLASS FIBERS COATED WITH AN ORGANO-
SILICON POLYOL
Lawrence P. Biefeld, Toledo, Ohio, Thomas E. Philipps, Cumberland, R.I., and Theodore J. Collier, Chillicothe, Ohio, assignors to Owens-Corning Fiberglas Corporation, a corporation of Delaware
No Drawing. Continuation of application Ser. No. 325,898, Dec. 13, 1952. This application July 13, 1959, Ser. No. 826,439.
3 Claims. (Cl. 117—126)

This invention relates to the use of glass fibers in combination with synthetic resinous materials in the manufacture of reinforced plastics and laminates, coated fabrics and other bonded glass fiber structures. It relates more particularly to the treatment of glass fibers in combination with resinous materials in the manufacture of structures of the types described.

This application is a continuation of our copending application Ser. No. 325,898, filed December 13, 1952, now abandoned.

Tremendous interest has centered about the use of glass fibers in combinations with resinous materials because of the exceptionally high strength properties of the glass fibers and their relative inertness under conditions which normally would be harmful to other fibers. To the present, however, it has not been possible to make full utilization of the strength properties of such glass fibers when used in combination with resinous materials. The reason for this is not in the limitation of the amount of glass fibers which can be incorporated or in any difficulty in substituting glass fibers for other fibers as a reinforcement with resinous materials. The inability to make better utilization of the high strengths of glass fibers with resinous materials is traceable more to problems peculiar only to glass fibers and the characteristics thereof.

By reason of the fact that glass fibers are formed by rapid attenuation of molten streams of glass, they form naturally into long thin non-porous rods having perfectly smooth surfaces which prevent the type of physical anchorage available with practically all of the natural fibers which are highly porous and have a large degree of surface roughness which enables the resinous material to seep in and become fully anchored. Because of the wholly inorganic nature of the glass fibers formed chiefly of silicon oxides, chemical softening such as is available to enhance a bonding relation with fibers formed of synthetic resinous materials is not available for development of similar adhesion with glass fibers. Because of the hydrophilic nature of the groupings that predominate on the glass fiber surfaces, ionic attraction to provide a type of chemical bond is not available and a weak bonding relation is established in the first instance between the glass fiber surfaces and the resinous materials. In the presence of high humidity, even this bond is substantially destroyed by the formation of a moisture film which separates the resinous material from the glass fiber surfaces. Thus, one of the principal obstacles to be overcome in the use of glass fibers in combination with resinous materials resides in the development of a strong and permanent bonding relation so that fuller realization may be had of the high strengths of the glass fibers in the plastic whereby the stresses to which the plastic material might be subjected can be distributed uniformly from fiber to fiber through the low strength, low modulus plastic matrix to avoid failure.

When glass fibers are combined with resinous materials in the manufacture of plastics, laminates and the like, it has been found best to make use of glass fibers in the form of cut strands, rovings, bonded mat or preferably in the form of a woven fabric. Where other fibers are able to be processed into these forms desired for reinforcement without any particular problems arising, glass fibers cannot safely be handled in the plying, twisting and weaving operations without having a protective coating on the glass fiber surfaces to prevent their destruction by abrasion and the like. Such protective coatings applied as a size to the glass fibers in forming must embody a desirable balance between lubricity and bonding with sufficient lubricity to permit relative movement between filaments in flexure and sufficient bonding to hold the filaments together in strand or bundle form but not so much bond as will cause the strands to stick together in the wound packages whereby loose ends are formed and continuous strands cannot be easily removed.

Thus it will be seen that glass fibers differ in their essential characteristics from other fibers and require certain treatments to improve their handling characteristics for processing throughout winding, twisting, plying and weaving steps and also require treatments to improve their performance characteristics for establishing a bonding relation with resinous materials before fuller utilization can be made of the strength properties of the glass fibers in the manufacture of various structures in combinations with resinous materials.

It is an object of this invention to provide a composition and a method for improving the performance characteristics of glass fibers when used in combinations with resinous materials in the manufacture of plastics, laminates, coated fabrics and bonded structures.

Another object is to provide a composition and method for treating glass fibers to improve their bonding relation with resinous materials and it is a related object to produce treated glass fibers which are capable of strong adhesion with resinous materials of the type melamine formaldehyde, urea formaldehyde, or other amide aldehydes, or phenol formaldehyde, furfural aniline or other resinous material formed by condensation reaction through methylol groups.

A further object is to provide a composition and method for treating glass fibers in forming to improve the performance characteristics thereof in establishing a strong bonding relation with resinous materials used in the manufacture of plastics, laminates, coated fabrics and other bonded structures.

A still further object is to provide a method for improving the handling characteristics and the performance characteristics of glass fibers used in combination with resinous materials and it is a related object to provide compositions for use in same.

A still further object is to provide a composition for use in the treatment of glass fibers in forming simultaneously and by a single operation to improve both the handling characteristics and the performance characteristics of glass fibers thereby to eliminate the multiple operations heretofore employed of first sizing the glass fibers to provide the necessary handling characteristics and then removing the size after the fibers have been processed to a condition for use as reinforcement followed by the immediate application of a treating composition for improving the performance characteristics of the fibers and it is a related object to provide a method for accomplishing same.

More specifically, it is an object of this invention to provide a composition which may be used for treatment of glass fibers after a previous size has been removed to increase the bonding relation with resinous materials or to provide a composition which, in the first instance, embodies the characteristics demanded of a size for glass fibers and also embodies the characteristics of an anchoring agent to improve the adhesion between resinous material and the glass fiber surfaces thereby to enable a single composition to be applied to the glass fibers in forming to improve the handling and performance characteristics thereof.

When the glass fibers have been processed into strands, yarns, mats, rovings or into woven fabrics for use in combination with resinous materials in the manufacture of plastics, laminates and the like, the need for a protective size to prevent destruction of the fibers, as by abrasion, is no longer present so that the size may be removed to permit subsequent application of an agent operative solely to couple a resinous material to the glass fiber surfaces. Removal of the previously applied size has been found to be advisable, otherwise the film forming material usually present in the size and the lubricant would block the development of a sufficient contacting relation between the coupling agent and the glass fiber surfaces to permit the desired reaction or coordination between the groups of one with the groupings of the other.

Excellent results as anchoring agents for the polyester resins and other resins formed by polymerization through ethylenic groups have been secured with the use of organo silanes having from 1 to 3 hydrolyzable groups and an organic group attached directly to the silicon atom containing less than 8 carbon atoms and an unsaturated carbon to carbon linkage capable of addition polymerization. The silicon oxide linkages appear strongly to coordinate with the silicon oxide groups which exist on the glass fiber surfaces or else the strong adhesion between the glass fiber surfaces and the organo silanes may result from a possible reaction between the negative or oxy groups that exist on the glass fiber surfaces and hydrolyzable positions on the organo-silicon or the hydroxy groups formed therein by hydrolyzation. Coordination or reaction between the silane thus attached to the glass fiber surfaces and the resinous binder apparently occurs through the reactive bonds in the silane or polysiloxane and the similar groupings or other highly functional groups in the resinous material.

One of the objections to the use of organo-silicons of the types described as an anchoring agent in the treatment of glass fibers to improve their performance characteristics resides in the inability to the present of making use of diluents which are free of hazards. While solvent systems present objections from the standpoint of cost and from the standpoint of presenting a fire hazard, they have been the only system available for use with many of the organo silanes that function excellently as special anchoring agents. It is desirable, however, wherever possible to make use of an aqueous system for reasons of cost and safety. In a copending application of Lawrence P. Biefeld et al., Ser. No. 312,872, filed October 2, 1952, description is made of a composition wherein organo silanes of the type described are contained in a stable aqueous system when alkali in the form of a water soluble metal base or ammonium hydroxide are present in sufficient quantity to form a corresponding water soluble salt of the silane, its hydrolysis product or its polymerization product and which have been found to catalyze the hydrolysis and polymerization reaction to the extent that a polymer or polysiloxane is deposited on the glass fiber surfaces upon drying.

One of the concepts of this invention resides in the improvement whereby it has been found that an organo silane of the character described may be applied to the glass fiber surfaces in an aqueous system when the silane is present in the form of a corresponding hydrolysis product (silanol) but in which the silanol is stabilized against customary immediate polymerization by condensation to the corresponding polysiloxane by reason of one or more of the organic groups attached directly to the silicon atom having an aryl or aromatic group. In the absence of the aromatic group, polymerization by condensation reaction between the hydroxyl group formed by hydrolysis of the silane would proceed in a rapid and sometimes uncontrolled manner, but in the presence of the aromatic groups in the organic group attached directly to the silicon atom a stabilizing effect is imparted which retards polymerization. The 1, 2 or 3 hydroxy groups present, instead permit the stabilized silanol to become dispersed to form a stable aqueous composition. The hydroxy groups of the silanols also remain capable of reaction with groupings that exist on the glass fiber surfaces and for combination or reaction with methylol or amino groups which may exist in the resin forming materials if of the type which polymerize by condensation reaction, such as urea formaldehyde, melamine formaldehyde or other amide aldehyde resins, phenol formaldehyde, resorcinol formaldehyde, cresol formaldehyde, furfural phenol or other phenolic type resins, polyesters, polyamides and the like. When heated to elevated temperature, polymerization may be caused to take place to set the silanol on the glass fiber surfaces upon drying.

Improvement to enhance the bonding relation between the resinous material formed by addition polymerization and the glass fiber surfaces is achieved when the aromatic group of the silanol comprises an alkaryl group, in which the alkyl group has less than 8 carbon atoms and contains an unsaturated carbon to carbon linkage capable of addition polymerization. Representative are such silanols as styryl silane triol, distyryl silane diol, distyryl methyl hydroxy silane and the like.

To enhance the bonding relation with resins formed by condensation through methylol groups or by aldehyde reaction as in urea-formaldehyde, melamine-formaldehyde, phenol-formaldehyde, resorcinol-formaldehyde resins and the like, groups capable of addition polymerization need not be present. Best use is made of silanols containing phenol or resorcinol or the like phenolic groups such as diphenol silane diol, phenol silane triol, cresol methyl silane diol and the like.

For greater stability in the treating composition, it is preferred to make use of ammonia or other alkalyzing agent soluble in the aqueous medium to adjust the pH of the treating composition to between 7 and 10. When used solely for the purposes of improving the adhesion of resinous materials, it will be sufficient if the concentration of the silanol in the treating composition ranges from 0.1 to 2.0 percent by weight.

The following formulations will represent compositions embodying features of this invention which may be applied to clean glass fiber surfaces for the improvement of the adhesion of resinous materials:

EXAMPLE 1

| | Percent by weight |
|---|---|
| Styryl methyl silane diol | 0.2 |
| Water containing ammonia in amounts to adjust the pH of the composition to between 7.5 and 8.5 | 99.8 |

EXAMPLE 2

| | Percent by weight |
|---|---|
| Diphenol silane diol | 0.4 |
| Water containing ammonia sufficient to adjust the pH to 8.0 | 99.6 |

After the treating composition has been applied as by conventional means to the glass fiber surfaces, the fibers may be allowed to air dry but it is preferred to accelerate the removal of the diluent and set the organo-silicon as an insolubilized polymer or monomer on the glass fiber surfaces by heating the treated fibers as to a temperature up to 350° F. for a few minutes. When applied to glass fibers from which previously applied size compositions have been removed, it is preferable to make use of a surface active agent of the conventional type to enhance the complete wetting out of the fibers.

It has been found in accordance with a further concept of this invention that the silanes of the type heretofore described having 1 to 3 hydrolyzable groups and at least one organic group attached directly to the silicon atom and containing an unsaturated carbon to carbon linkage or other highly functional group in an aliphatic group containing less than 8 carbon atoms for enhancing bonding of ethylenic polymers or hydroxy, amino, carboxy and phenolic groups as will hereinafter be described for improving adhesion of phenol-aldehyde type resins or urea-aldehyde type resins may be embodied as such in aqueous medium when so widely dispersed therein as to be capable of hydrolyzation to the corresponding silanols but incapable of sufficient contact one with another for polymerization. To maintain sufficient separation between molecules, it is believed necessary to resort to the use of supersonic vibrations of extensive emulsification of the silane in water and for best practice the silane should first be dissolved in a solvent system with which it is emulsified in the aqueous medium.

Stabilization of the system is improved by the presence of alcohol in the composition in amounts up to about 70 percent. Silanes such as vinyl triethoxy silane, divinyl diethoxy silane, diphenol diethoxy silane and the like have been successfully emulsified in aqueous medium in concentrations ranging from 0.1 to 2.0 percent by weight for use as an anchoring agent.

The use of silanes, silanols and polysiloxanes of the type described having an unsaturated group or other highly functional group in the organic radical has been found to be very effective for developing greater adhesion between the resinous material and the glass fiber surfaces for maximum utilization of the strengths of the glass fibers when used in combination with polyester resins or other resins formed by addition polymerization but such anchoring agents have been found to be less effective with resinous materials formed by condensation polymerization through methylol groups, such as represented by the formation of resins of the type urea-formaldehyde, phenol-formaldehyde, melamine-formaldehyde, furfural phenol, resorcinol-formaldehyde, aniline-formaldehyde and the like. In accordance with another concept of this invention, adhesion between glass fibers and such resinous materials can be greatly improved by the use of a treating composition containing an anchoring agent in the form of a silane, its hydrolysis product and its polymerization reaction product, in which the silane has from 1 to 3 highly hydrolyzable groups, such as chloro, bromo, ethoxy, methoxy groups and the like and an organic group which contains hydroxy, amino or carboxyl groups which in the presence of an aldehyde causes the formation of methylol groups capable of reaction with the resin forming materials or capable in themselves of reaction with groupings of the resin forming materials thereby to tie in the resinous material with the glass fiber surfaces.

By way of illustration, use may be made of silanes, their silanols and polysiloxanes in which the silane has from 1 to 3 hydrolyzable groups and at least one organic group in the form of a phenol, cresol, resorcinol group or the like having reactive meta or para positions capable of functioning in combination with an aldehyde to form methylol groups reactive with other hydroxy, amino or carboxy groups in resin formation.

As previously described, the silane is capable of attachment to the glass fiber surfaces by reaction or bonding through the silicon atom on the hydroxy groups formed upon hydrolysis. In the presence of aldehyde, such as formaldehyde, methylol groups form on the ortho position of the phenolic radical which enter into the reaction as any other phenol in the formation of a phenol-formaldehyde resin or as any other methyl group in the formation of urea-formaldehyde or melamine-formaldehyde resins. The described concepts may be illustrated by the following examples of treating compositions for use in improving the adhesion of condensation resins with the glass fiber surfaces:

EXAMPLE 3

| | Percent by weight |
|---|---|
| Phenol trichloro silane | 0.3 |
| Petroleum solvent | 99.7 |

EXAMPLE 4

| | Percent by weight |
|---|---|
| Dicresol diethoxy silane | 0.2 |
| Water containing sufficient sodium hydroxide to adjust the pH of the composition to between 10 and 12 | 99.8 |

EXAMPLE 5

| | Percent by weight |
|---|---|
| Diphenol silane diol | 0.4 |
| Water | 99.6 |

EXAMPLE 6

| | Percent by weight |
|---|---|
| Phenol methyl polysiloxane | 0.25 |
| Water containing a dispersing agent for emulsifying the polysiloxane in the aqueous medium | 99.75 |

EXAMPLE 7

| | Percent by weight |
|---|---|
| Cresol methyl sodium polysiloxanolate | 0.5 |
| Water | 99.5 |

The above compositions may be applied to clean glass fiber surfaces in forming or after the size which has previously been applied has been removed, as described in connection with Examples 1 and 2.

Excellent adhesion between the amide aldehyde type resinous materials or the phenol aldehyde type resinous materials with the glass fiber surfaces results also when the anchoring agent is selected of a silane, its hydrolysis products and its polymerization products wherein the silane is formed with 1 to 3 hydrolyzable groups of the type described and with an organic group containing an amino or hydroxy group cable of condensation reaction with methylol or hydroxy groups of the resin forming materials or capable of condensation reaction with carboxyl groups of the resin forming materials as in the formation of polyesters or polyamides. Unlike the limitation imposed by the length of the organic group or the activity of the unsaturated or highly functional groups in the anchoring agents of the types heretofore employed, the length of the organic group apparently has little, if any, effect on the ability of the amino or hydroxy groups to enter into reaction with the hydroxy, amino or carboxy groups of the resin forming material although it is preferable to make use of the shorter chain organic groups wherever possible.

Silanes, their hydrolysis products and their polymerization products of the type described in the following issued patents may be used as the anchoring agents in the practice of the concepts just described and claimed:

Cheronis, No. 2,579,417 and No. 2,564,674
Sommers, No. 2,557,802
Clapsdale, No. 2,541,154
Johannsen, No. 2,429,883

Instead of making use of a silane formed with an amino or hydroxy group for reaction by condensation with methylol, carboxyl or amino or hydroxy groups of the resin forming components, use may be made of a silane, its hydrolysis products and its condensation polymerization products in which the organic groups of the silane contain a carboxy group capable of condensation reaction with hydroxy or amino groups of the resin forming materials, as in the reaction with polyhydric alcohols and polybasic acids in the manufacture of a polyester or in the reaction with amino or hydroxy groups available during polymerization of phenol-formaldehyde, urea-formaldehyde, melamine-formaldehyde resins, and so on.

As in the concept previously described, the number of carbon atoms in the organic group is not critical but it is best to make use of silanes having from 1 to 3 hydrolyzable groups and in which the carboxyl containing organic group has less than 8 carbon atoms.

In practice, silanes of the type described, their hydrolysis products or their polymerizaiton products in amounts ranging from 0.1 to 2.0 percent by weight may be substituted for the silanes, silanols, polysilanes or polysiloxanolates of the compositions of Examples 3–6.

As previously pointed out, anchoring agents of the type described relying chiefly upon the presence of the silanes, their hydrolysis products and polymerization products, are generally incapable in themselves of providing the balance between bonding and lubricity necessary to protect the glass fibers in processing. Application thereof is, therefore, limited chiefly to glass fibers after they have been transformed into the condition desired for combination with resinous materials. While improved performance characteristics result from the use of the anchoring agents in combination with the usual size compositions or with the resinous binder, the presence of the larger concentration of size materials or resinous binder prevents the existence of a full contacting relation between the anchoring agent and the glass fiber surfaces believed necessary for the development of an optimum bonding relation.

It has been found that the difficulties heretofore existing which prevent a good bonding relation to be established when an anchoring agent is applied to the glass fiber surfaces having a size thereon may be substantially completely overcome by the use of a size composition having as its film forming ingredient, (1) a substance which is soluble or compatible with the resinous binder to be applied to the glass fibers and/or (2) a substance which has hydroxy or amino groups available for reaction with groups in the resin forming ingredients such as the hydroxy groups existing during reaction of phenol formaldehyde, urea formaldehyde, melamine formaldehyde, furfural aniline, polyhydric alcohols and polybasic acids in the formation of resinous materials used with glass fibers in the manufacture of plastics or laminates.

As a result, it is possible for the first time to produce a composition capable of application as a single composition to the glass fibers in forming to impart good performance and processing characteristics without loss of bonding. This enables the elimination of the multiple steps heretofore required of applying a size to the glass fiber surfaces followed by the removal of the size from the fibers after they have been processed and the subsequent application of a composition containing the desired anchoring agent. It eliminates the possibility of fiber weakening or destruction which usually occurs while handling the fibers after the size has been removed and before combination with the resinous binder.

Solution or compatibility between the film forming ingredients of the size and the resinous materials applied as a coating or laminating material effectively eliminates the spaced relation which has heretofore existed in the presence of a size and which is believed responsible for the inability of the anchoring agent more adequately to improve the bonding relation. When the film forming material is soluble or compatible with the resinous binder, wetting out of the treated fibers becomes more rapid and more complete and the film former permits the resinous binder to function as though it engaged the glass fiber surfaces directly to enable operation of the anchoring agent in effecting an improved bonding relation.

In the copending application of Theodore J. Collier, Ser. No. 313,783, filed October 8, 1952, description is made of a size composition which combines a silane having 1 to 3 hydrolyzable groups and a saturated film forming polyester resin free of cross linking, such as may be formed by reaction of a saturated dihydric alcohol with a saturated dibasic acid. Because of the freedom of cross linkages, the polyester resin remains substantially soluble in the polyester binder generally used with the glass fibers and thereby enables full activity of the anchoring agent to enhance the bonding relation.

The further improvement herein resides in the utilization of the principles defined in the aforementioned copending application but provides for a modification thereof to improve the bonding relation with such resinous binders as melamine formaldehyde resins, urea formaldehyde resins, phenol formaldehyde resins and the like. In accordance with the practice of the present invention, an improved bonding relation with condensation resins of the type described is achieved by the use of an anchoring agent of the types heretofore described in combination with a film former in which there is present an excess of hydroxy or amino groups in a polyester resin free of cross linkages and wherein the free hydroxy or amino groups are capable of reaction with the hydroxy or amino groups of the resinous binder or the materials of which they are formed but which are incapable of causing cross linkages which would otherwise cause the film former to become less soluble and less compatible in the resinous binder.

As the film former, use may be made of a polyester resin of the type described in the aforementioned pending application but in which the polyhydric alcohol or the polybasic acid is selected to provide a saturated polyester free of cross linking having amino or hydroxy groups available for reaction with the silane or its hydrolysis products and for reaction also with methylol or other hydroxy or amino groups of the resinous binder.

Other film forming materials soluble or compatible with the resinous binder of the type described and having the necessary free hydroxy or amino groups may be selected of the water soluble hydroxy resins such as polyvinyl alcohol, phenol formaldehyde, urea formaldehyde, melamine formaldehyde, or other condensation resin in an intermediate water soluble stage, or of a water soluble cellulose derivative in the form of water soluble cellulose ethers or esters or salts thereof, such as hydroxy ethyl cellulose, methyl cellulose, carboxy methyl cellulose, cellulose, cellulose ether sulphate and the like, or proteins of the type zein, casein, gelatin, or gums such as arabic, alginates, tragacanth or the like.

Treating compositions containing an anchoring agent for purposes of developing adhesion to the glass fiber surfaces and containing a film former of the type described, preferably in combination with a lubricant to impart the desired balance between lubricity and bonding, may be formulated to contain from 0.1 to 2.0 percent by weight of the anchoring agent, 0.5 to 5.0 percent by weight of the film former, alone but preferably in combination with 0.5 to 3.0 percent by weight lubricant introduced either as an aqueous dispersion or in solution with aqueous medium when the lubricant is water soluble such as the reaction product of acetic acid with tetraethylene pentamine stearate (Pelargonate—manufactured by Arnold Hoffman Company).

The following will be representative of treating compositions capable of being applied in forming to the glass fiber surfaces to provide the necessary processing characteristics and to improve the adhesion of the amide aldehyde or phenol aldehyde type resinous materials with the glass fiber surfaces. For purposes of simplification, only one example will be given but it will be understood that the various silanes and that the various water soluble film formers of the type described may be incorporated with variation in amounts within the ranges described to give the desired viscosity and stability in use.

Where reliance is had upon the film former for tie-in between the resinous material and the silane which becomes bonded to the glass fiber surfaces, the silane is not limited in the composition of its organic group but any silane may be used having from 1 to 3 readily hydrolyzable groups which before or after hydrolyzation reacts with the hydroxy or amino groups of the film forming component.

Vastly improved performance characteristics are secured when reliance is had, however, both upon the film former and the silane in combination to improve the bonding relation between the resinous material and the glass fiber surfaces. For this purpose, instead of making use merely of a silane having from 1 to 3 hydrolyzable groups or the hydrolysis product thereof, the silane should be of the type previously described for securing anchorage alone, namely, silane or its hydrolysis product having from 1 to 3 hydrolyzable groups and an organic group attached directly to the silicon atom containing an unsaturated carbon to carbon linkage capable of addition polymerization or a highly functional group of the type described in the Steinman Patent No. 2,552,910 wherein an acido group coordinated with a trivalent nuclear chromium atom in a Werner complex compound contains highly functional groups for coordination with groupings in resinous binders to enhance their bonding relation with glass fibers treated with the complex.

The following will illustrate some of the practices of this concept of the invention:

EXAMPLE 8

| | Percent by weight |
|---|---|
| Hydroxy ethyl cellulose | 4.0 |
| Polyethylene glycol lubricant (molecular weight 1500) | 0.5 |
| Divinyl dichloro silane | 0.2 |
| Water, plus ammonia to adjust the pH of the composition to between 7 and 10 | 95.3 |

EXAMPLE 9

| | Percent by weight |
|---|---|
| Polyvinyl alcohol | 5.0 |
| Methallyl diethoxy silane | 0.25 |
| Hydrogenated vegetable oils | 0.5 |
| Hydrocarbon solvent | 94.25 |

EXAMPLE 10

| | Percent by weight |
|---|---|
| Gelatin | 0.25 |
| Dicoco dimethyl ammonium chloride | 0.3 |
| Diphenol silane diol | 0.25 |
| Water | 99.20 |

EXAMPLE 11

| | Percent by weight |
|---|---|
| Sodium alginate | 1.0 |
| Glass fiber lubricant (Arnold Hoffman Company— Pelargonate acid solution in acetic acid) | 0.3 |
| Dimethyl diethoxy silane | 0.25 |
| Emulsifying agent | 0.1 |
| Water, with ammonia sufficient to adjust the pH to between 7 and 10 | 98.35 |

In the preparation of compositions of Examples 8 and 11, the silane is incorporated in the ammoniacal solution of the water soluble film former in water. The lubricant is incorporated by emulsification. In Example 9, the polyvinyl alcohol and silane are heated together to form a clear solution dissolved with the vegetable oils in the solvent medium.

In Example 10, the silane is stable in water solution but alkali may be added to maintain greater stability and the lubricant and film former are also soluble in water so that a stable aqueous composition may be formed.

By way of still further modification in a composition for use as a single treatment adapted to be applied to glass fibers in forming for the improvement of their processing and performance characteristics, use may be made of a product of the reaction between a silane having at least two hydrolyzable groups or its corresponding silanol and a polyol also having at least two hydroxy groups which form or are formed into a polymer of higher molecular weight such as the polyethylene glycols, generally known as "Carbowax." It is preferred that either the silane, the corresponding silanol or polyethylene glycol or other polyol, have functional groups such as unsaturated carbon to carbon linkage for the purpose of enhancing adhesion of such resinous binders as the unsaturated polyesters or resin forming materials based upon addition polymerization or else that the organo-silicon or polyol contain highly functional groups of the type previously described for coordination with groupings in the resinous materials as described in the Steinman Patent No. 2,552,910. For use as an anchoring agent to bond the amide aldehyde or phenol aldehyde type condensation resins with the glass fiber surfaces, the organo-silicon or polyol or both should be selected to have free hydroxy or amino groups or groups which function to produce hydroxy groups on the molecule in the presence of an aldehyde such as phenol, cresol and the like groupings.

Representative of silanes and polyols which may be used as reactants to produce the desired polymers for glass fiber treatment include vinyltrichloro silane, divinyl-dimethoxy silane, diphenol silane diol, distyryl diethoxy silane, beta-chloroallyl alcohol and the like. When the silane contains the functional group, simple polyols of the type ethylene glycol, propylene glycol, polyethylene glycol and the like may be used for reaction therewith. To produce a product having sufficient molecular weight to provide lubricity and bonding, it is necessary to have at least two hydroxy groups in the polyol and at least two hydrolyzable positions available on the silane for conversion to hydroxy groups upon hydrolyzation whereby ether type condensation can be achieved. It is preferred also to have an excess of hydroxy groups, where possible, in the formed polymer for purposes of bonding or reaction with groups that exist on the glass fiber surfaces.

As in the polyethylene glycol compounds, the condensation reaction product of the silane or its hydrolysis product and the polyol or polyethylene glycol may be adapted to combine the characteristics of a film former and lubricant to protect the glass fibers when applied in forming and the unsaturated, highly functional, or hydroxy, amino or carboxy groups contained in the polymer provide intermittent basis for reaction or coordination with the resinous binder materials whereby a firm bond is established with the glass fiber surfaces in order to make fuller utilization of the strengths therein. The concepts relating to the improvement resulting from solution or compatibility with the resinous binder will also prevail here in most instances since the polymers are capable of solution or compatibility with the resinous binders and may function as a plasticizer or lubricant therewith.

The following is an illustratition of a procedure for preparing the polyether compound and utilization thereof in the treatment of glass fibers. It will be understood that substitution may be made with other related compounds with corresponding results but, for purposes of simplification, detailed illustration of each will be avoided.

EXAMPLE 12

| | Grams |
|---|---|
| Polyethylene glycol (1500 M.W.) | 3000 |
| Vinyltrichloro silane | 30 |
| Toluene | 300 |

The polyethylene glycol is melted and mixed with 200 grams of the toluene. The vinyltrichloro silane is dissolved in the remainder of the toluene and the polyethylene glycol solution is then added to the solution of the silane. The mixture is boiled until a loss in weight of about 320 grams is secured. The reaction product is then dispersed in water to make up about 4000 grams.

In the use of the organo-silicon compounds alone in the treatment of glass fibers, one of the preferred systems comprises the formulation of a treating composition with polysiloxanes having unsaturated groups capable of addition polymerization. It has now been found in most instances where the polysiloxane is formed of a silane having three hydrolyzable groups, such as vinyltrichloro silane, that a cyclyzed polymer is formed in which most of the unsaturated groups, such as the vinyl groups, become oriented towards the inside of the polymer sphere and are not available actively for reaction or orientation with the resin forming materials of the binder. As a result a maximum utilization of the unsaturated groups present in the polysiloxane cannot be made for purposes of improving the bonded relation of the resinous materials with the glass fiber surfaces.

It has been found, however, that silanes having only two hydrolyzable groups and containing one or more organic groups having unsaturated or other highly functional groups can be polymerized to form a siloxane which does not cure to a three-dimensional cyclyzed resin but forms a linear siloxane in which the unsaturated organic groups remain open and free for reaction or bonding with groupings of the resin forming materials.

When the length of the formed linear polymer is sufficient, as controlled by the conditions of the reaction including time, temperature, catalyst and the type of silane, lubrication and bonding will also result upon application to the glass fiber surfaces to give good processing characteristics as well as good performance characteristics. Under such conditions, the siloxane may be applied without other film former or lubricant to the glass fibers in forming.

More particularly, the improvement in an anchoring agent which may also embody lubricity and bonding to permit use of a single treating composition in application to glass fibers in forming resides in the use of a siloxane in the form of a substantially linear polymer having organic groups containing unsaturated or highly functional groups or containing hydroxy, amino or carboxy groups, and in which the silane of which the polymer is formed contains two hydrolyzable groups as in divinyldichloro silane, diallyldiethoxy silane, distyryldichloro silane, allylmethyldichloro silane, vinyldiethoxy silane, diphenoldichloro silane and the like. A small proportion of the silane may contain less than two or more than three hydrolyzable groups but the amount should be less than that capable of causing predominant proportions of cross linking or cyclyzed polymers.

Polymerization of the silane monomer through the hydrolysis stage to the polymer may be carried out by conventional means now so well established in the trade that description thereof is not believed necessary. When reaction takes place in ammonia or other alkali metal base, a polysiloxanolate is formed which is substantially soluble in aqueous medium and may be applied to the glass fiber surfaces from water solution but which becomes insolubilized on the glass fiber surfaces upon drying. The functional groups in the linear siloxane remain effective as described.

When the polymer has a molecular weight in excess of 3000, use can be made thereof as a combined anchoring agent and size in the treatment of glass fibers in forming. When less than 1000 molecular weight, use is made thereof possibly as an anchoring agent for application to the glass fiber surfaces after processing to a condition for use as a reinforcement with resinous materials or else use may be made thereof in combination with film formers of the type previously described which are soluble or compatible in the resinous binder.

The following examples will illustrate this concept of the invention:

EXAMPLE 13

Percent by weight
Divinyl polysiloxane (molecular weight 1000)_____ 1.0
Water, containing a dispersing agent for emulsification of the polysiloxane therein_____ 99.0

EXAMPLE 14

Percent by weight
Divinyl polysiloxane (molecular weight 5000)_____ 5.0
Hydrocarbon solvent_____ 95.0

EXAMPLE 15

Percent by weight
Sodium methallylmethyl polysiloxanolate_____ 4.0
Water, containing sufficient alkali to maintain the stability of the solution_____ 96.0

To the present, description has been made of various concepts for the treatment of glass fibers to improve their performance characteristics or their performance and processing characteristics wherein use is made of an organo-silicon compound in the form of a silane, silanol, polysiloxane or polysiloxanolate.

By way of still further improvement, it has been found that the organo silane of the polysiloxanes of the type described which have been used in combination with film formers in formulation of a treating composition may be replaced by Werner complex compounds including monomers and polymers where the trivalent nuclear chromium atom has an acido group coordinated therewith containing groups similar to those previously described in the silanes or polysiloxanes for providing a receptive base for the resinous binders. When the acido group contains an unsaturated carbon to carbon linkage, improved adhesion is achieved with the polyester resins and other addition polymerization resins. When, as described, the acido group contains a hydroxy, amino or carboxy group, reaction is possible to integrate the coupler with resinous materials of the type formed by condensation polymerization through hydroxy, amino or carboxy groups as in the phenol aldehyde type resins, amide aldehyde type resins, polyester resins, polyamides and the like. When used in combination with film formers of the type described which are soluble or compatible in the resinous binder, the composite properties of a size and an anchoring agent are provided in a single treating composition. Suitable film formers include materials of the type previously described, such as the more water soluble cellulose ethers and esters, polyvinyl alcohols and hydrolyzed acetates, saturated polyesters free of cross linkage, proteins, alginates, gums and the like.

Particular importance resides in a new and improved system based upon the use of a completely or substantially hydrolyzed polyvinyl acetate in combination with a Werner complex compound in which the acido group coordinated with the trivalent nuclear chromium atom constitutes a phenolic group containing free hydroxyls, amino or carboxy groups capable of reaction of the hydroxy, amino or carboxy groups of the resinous materials. Werner complex compounds of the type described may be illustrated by 2,4-dihydroxy benzoic acid chrome complex. In use, the polyvinyl acetate should be hydrolyzed at least 50 percent and preferably about 60 percent.

By way of still further modification, new and improved anchoring agents unlike those previously described but which may be used effectively to improve the adhesion of resinous materials on glass fiber surfaces have been found to include the reaction product of furfural and aniline. The product is a cationic material which is substantially soluble or easily dispersible in water and in which, it is believed, that anchorage is secured to the glass fiber surfaces through the basic nitrogen or cationic group. The unsaturated group in the furfural component apparently remains active sufficiently to provide the desired attraction or reaction with such resinous systems as the polyesters and other resins formed by addition polymerization while the amino group appears also to remain available in the furfural aniline reaction product to provide a base for combination with such condensation resins as are used in the production of a cured phenol formaldehyde, cresol formaldehyde, resorcinol formaldehyde or the like phenol aldehyde resin or amide aldehyde resins of the type urea formaldehyde, melamine formaldehyde and the like.

It is preferred to combine the furfural and aniline in about equimolecular proportions but the components may be varied from three mols of one to one mol equivalent of the other to produce the desired results. Reaction will take place slowly at elevated temperatures and more rapidly even without heat in the presence of an acidic catalyst.

In use, the furfural aniline anchoring agent may be applied from aqueous medium or solvent solution in concentrations ranging from 0.5 to 10.0 percent by weight. Application may also be made in equivalent concentrations in combination with the resinous binder applied to the glass fiber surfaces in the manufacture of laminates, plastics and the like. Upon application, the treating composition may be allowed to air dry or elevated temperatures in the range of 250-400° F. may be used to accelerate the elimination of diluent and more completely to insolubilize the reaction product on the glass fiber surfaces.

Improved adhesion to glass fiber surfaces has been secured by the use of an anchoring agent in the form of a base exchange compound wherein the acido group attached to metallic components of the type calcium, lead or other polyvalent metal of the type described in the Hyde Patent No. 2,245,783, has less than 8 carbon atoms and contains an unsaturated carbon to carbon linkage or other highly functional group whereby the treated surface becomes attracted to such resinous materials as the polyesters and others formed by addition polymerization. When the acido group contains a reactive hydroxy, amino or carboxy group, the limitation as to carbon length is not critical so long as it is possible to combine the acido group by reaction with an amide aldehyde, phenol aldehyde or polyester resin forming materials or other resins of the type described based upon condensation reaction by the hydroxy, amino or carboxy groups.

In operation, it appears that base exchange occurs between the sodium or other alkali metal groups in the glass fibers and the polyvalent metal base of the complex compound whereby the complex becomes attached to the glass fiber surfaces. Acido groups such as an unsaturated acrylic, methacrylic, styroic, acidic or other organic group containing highly functional groups such as described in the Steinman Patent No. 2,552,910 or containing a functional hydroxy, amino or carboxy group, react through the functional grouping with resinous components to tie in the resin with the glass fiber surfaces.

Base exchange compounds of the type described are, in general, water soluble but may be applied, if desired, from solvent solution. Concentrations in amounts ranging from 0.1 to 2.0 percent by weight in treating compositions are sufficient to provide the desired improvement and use may be made thereof in equivalent concentrations as an ingredient in the resinous binder to improve the adhesion thereof with the glass fiber surfaces.

EXAMPLE 16

| | Percent by weight |
|---|---|
| Calcium acrylate complex | 0.5 |
| Water | 99.5 |

The above treating composition representative of the use of the base exchange compound may be applied to the glass fibers after the size has been removed. The treated glass fibers may be air dried but it is best to accelerate drying and setting of the complex on the glass fiber surfaces by the use of elevated temperatures.

Though not equivalent to the base exchange materials or the Werner complex compounds wherein coordination with the glass fiber surfaces occurs through a trivalent nuclear chromium atom, it has been found that resinous adhesion may be improved by the treatment of the glass fiber surfaces with titanium ester compounds such as formed by the reaction of a titanate with a polyester having hydroxy or amino groups for ester interchange as illustrated by the following equation:

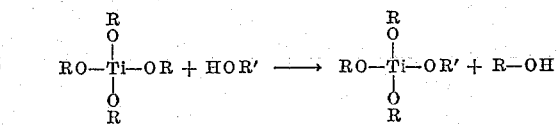

In the above, R constitutes a short-chained alkyl or aryl group such as ethyl, propyl, butyl, phenyl, benzyl and the like, and R' is a polyester having one or more free hydroxy or amino groups such as

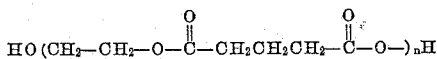

The polyester titanates are capable, when applied to the glass fiber surfaces, of functioning as a combined size and lubricant to improve the performance and the processing characteristics of the glass fibers. When used as an anchoring agent, alone or in combination with other resins, the concentration thereof to achieve the desired results may range from 0.2 to 2.0 percent by weight. When used as a size and anchoring agent, the amount in the treating composition should be increased to between 0.5 to 10.0 percent by weight.

It is believed that anchorage to the glass fiber surfaces occurs through the titanium nucleus and that groupings of the type heretofore described may be embodied in the polyester to enhance reaction or coordination with the resinous binder or the polyester may be of the type which is saturated and free of cross linkages so as to be soluble or compatible with the resinous binder to permit close contact between the binder and glass fiber surfaces as in the concepts previously described.

*Application*

When anchoring agents of the type heretofore described, alone or in combination with film formers capable of reaction or solution with the binder resins, are able to provide protection to the glass fibers in processing, application may be made from solvent solution or aqueous medium to the glass fiber filaments in forming. In the manufacture of continuous fibers, hundreds of streams of molten glass issuing from the underside of a bushing in the bottom wall of a glass melting furnace are rapidly attenuated by drawing at speeds of 5,000 to 10,000 feet per minute and wound about a drum. Intermediate the bushing and drum, the attenuated fibers are gathered together into a strand and it is at this point that the treating composition is best applied as by means of a wiper pad or roll applicator.

The treating composition may be allowed to dry on the glass fiber surfaces wound about the drum. The deposited coating should possess sufficient bonding to maintain the strand relation but insufficient to cause one strand to adhere to another on the drum and it should also possess sufficient lubricity to permit relative movement of the fibers in flexure. For application to the glass fibers in forming, concentrations within the range of 0.5 to 15.0 percent by weight will be sufficient to protect the fibers and modify the surface characteristics thereof for improved resinous anchorage.

When the anchoring agents previously described are incapable of imparting the desired processing characteristics, application should be made to the glass fibers after they have been processed with a conventional size. The size should be removed by washing or by burning off and the anchoring agent applied as by a dip-squeeze process, roller coating process or the like. Concentrations ranging from 0.1 to 2.0 percent by weight of the anchoring agent have been found sufficient with most of the material described. The treated glass fibers may be air dried but it is preferred to make use of elevated temperatures to accelerate drying and to set the anchoring agent on the glass fiber surfaces.

It will be apparent that various concepts have been advanced for the treatment of glass fibers to nullify their inherent hydrophilic characteristics and to make the surfaces preferentially receptive to resinous binders. As the result of such treatments, better utilization can be made of the high strengths of the glass fibers as a reinforcement. By the use of the techniques described, the strength properties of plastic materials have been doubled and even tripled without increase in glass fiber content and have been improved to the point where, on a weight basis, the glass fiber reinforced plastics embody strengths greater than that of steel. As a result thereof, glass reinforced plastics have been adopted in many applications as a structural and insulating material having improved strength, appearance and permanence.

It will be understood that changes may be made in the various combinations of materials, their method of application and in the method of treating the glass fibers without departing from the spirit of the invention, especially as defined in the following claims.

We claim:
1. The method of treating glass fibers to improve the processing characteristics of the fibers and to improve the bonding relation of the glass fibers with resinous materials comprising coating the fibers with an organo-silicon compound formed of a silane having at least two hydrolyzable groups and an organic group attached directly to the silicon atom containing a group selected from the group consisting of hydroxy, amino and carboxy groups capable of condensation reaction with groupings of the resinous material and polymerized to form a polyol, and heating the coated fibers to set the organo-silicon polyol on the glass fiber surfaces.

2. Glass fibers coated with an organo-silicon polyol in which an organic group attached directly to the silicon atom contains less than 8 carbon atoms and has a highly functional group selected from the group consisting of hydroxy, amino and carboxy groups to enhance the adhesion of resinous materials for the coated glass fiber surfaces.

3. The method of treating glass fibers to improve their processing characteristics and to improve the bonding relation with resinous materials comprising coating the glass fibers in forming with a composition formed by the reaction product of a polyethylene glycol and an organo-silicon compound in the form of an organo-silicon polyol having free groups selected from the group consisting of hydroxy and amino groups capable of reaction with the polyethylene glycol and having an organic group attached directly to the silicon atom containing less than 8 carbon atoms and having a highly functional group, and heating the coated glass fibers to set the polyethylene glycol-organo-silicon compound reaction product on the glass fiber surfaces.

References Cited in the file of this patent

UNITED STATES PATENTS

| | | |
|---|---|---|
| 2,390,370 | Hyde | Dec. 4, 1945 |
| 2,541,896 | Vasileff | Feb. 13, 1951 |
| 2,552,910 | Steinman | May 15, 1951 |
| 2,611,718 | Steinman | Sept. 23, 1952 |
| 2,688,006 | Steinman | Aug. 31, 1954 |
| 2,688,007 | Steinman | Aug. 31, 1954 |
| 2,723,210 | Biefeld | Nov. 8, 1955 |
| 2,723,211 | MacMullen | Nov. 8, 1955 |
| 2,759,959 | Frisch | Aug. 21, 1956 |
| 2,763,573 | Biefeld | Sept. 18, 1956 |
| 2,766,142 | Thomas | Oct. 9, 1956 |
| 2,838,418 | Starkweather | June 10, 1958 |
| 2,891,885 | Brooks | June 23, 1959 |